Sept. 28, 1965    C. P. McHUGH    3,208,721
VALVE DIAPHRAGM
Filed April 30, 1963
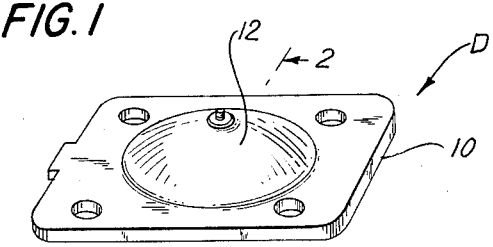
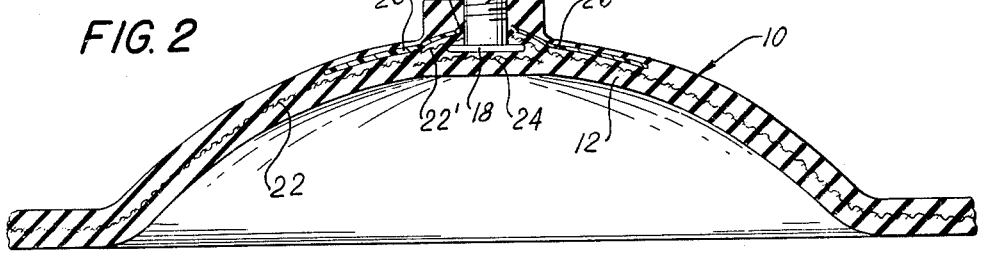
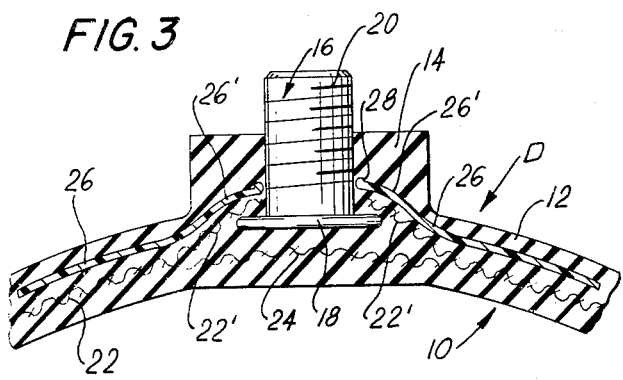
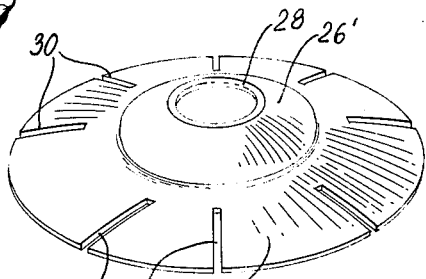
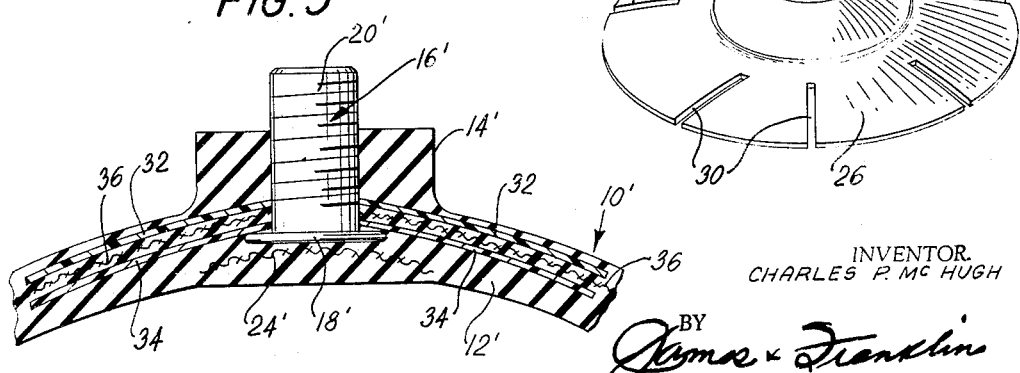
INVENTOR.
CHARLES P. McHUGH
BY James & Franklin
ATTORNEYS

United States Patent Office 3,208,721
Patented Sept. 28, 1965

3,208,721
VALVE DIAPHRAGM
Charles P. McHugh, Ridgewood, N.J., assignor to Raybestos-Manhattan, Inc., Passaic, N.J., a corporation of New Jersey
Filed Apr. 30, 1963, Ser. No. 276,934
4 Claims. (Cl. 251—331)

This invention relates to a valve diaphragm, and more particularly to improvements in an elastomer diaphragm for use with the so-called Saunders type valve.

The valve diaphragm to which the present invention pertains comprises a rubber body having a domed section provided with a central nodule member, a lifting stud having a head embedded in the nodule member and a shank protruding therefrom, the said rubber body being capable in the operation of the valve of being flexed between dome upright and dome inverted positions. In such diaphragms, it is important to provide means in the area of the lifting stud to strengthen or reinforce the diaphragm against stud pull-out on opening the valve or holding the same open against pressure.

Such strengthening or reinforcing means have been provided in prior diaphragms by the use of fabric and metallic rings or discs located in the domed section and surrounding the shank above the head of the stud. Such prior means have, however, proved inadequate. Fabric reinforcements have been generally found inadequate by themselves; and these have consequently been combined with metallic disc reinforcements. Metallic rings or discs must necessarily be small in diameter, for otherwise they extend too far into the flexing area of the diaphragm, in which case they would make the diaphragm stiff and less satisfactory in performance, and because of the large difference in flexibility between the disc and the fabric-elastomeric material, a hinge action would develop at the outer edge of the disc, thereby overstraining the fabric reinforcement and causing rapid fatigue and rupture. A metallic disc small enough to remain out of the flexing zone is too small to have sufficient area for proper adhesion to the fabric-elastomer structure. Thus, it cannot give the maximum desired reinforcement to the shear stresses set up in operating the valve.

I have found that the use of reinforcing discs made out of certain plastic materials, used alone and particularly when used in combination with a fabric reinforcement, very materially strengthens such diaphragms against stud pull-out. The prime object of the present invention centers about the provision of valve diaphragms embodying such reinforcing and strengthening means.

To the accomplishment of the foregoing object and such other objects as may hereinafter appear, my invention relates to the valve diaphragm structure as more particularly defined in the appended claims taken together with the following specification and the accompanying drawings, in which:

FIG. 1 is a perspective view of the valve diaphragm;
FIG. 2 is an enlarged view taken in a central cross-section of the diaphragm depicting one manner of applying the improvement of the present invention thereto;
FIG. 3 is a fragmentary view taken on a still further enlarged scale and also taken in a central cross-section of the diaphragm;
FIG. 4 is a perspective view of one form of a plastic disc that is employed for the strengthening and reinforcing means of the diaphragm; and
FIG. 5 is a fragmentary and cross-sectional view similar to that of FIG. 3 but showing a modification of the diaphragm structure.

Referring now more in detail to the drawings, and first to FIGS. 1 to 3 thereof, the valve diaphragm generally designated as D embodies a structure of the type for use with a so-called Saunders type valve. Such a diaphragm comprises an elastomer body generally designated as 10 having a domed section 12 provided with a central boss or nodule member 14. For lifting the diaphragm a stud generally designated as 16 is provided, the said stud having a head 18 and a shank 20 embedded in the nodule member 14, the shank 20 protruding from the nodule member for connection with a compressor operating member (not shown). Preferably, a reinforcing fabric sheet 22 is embedded in the diaphragm body 10 as clearly depicted in FIGS. 2 and 3 of the drawings, the said fabric sheet having a part 22 located above the stud head 18 and surrounding the shank 20 of the stud. Additional reinforcing fabric elements 24 may be embedded in the diaphragm body below the stud head 18 as clearly depicted in FIGS. 2 and 3 of the drawings.

I have found, as above stated, that the use of reinforcing discs made out of certain plastic materials, used alone and particularly when used in combination with a fabric reinforcement, very materially strengthens such diaphragms against stud pull-out. The criteria of such plastic material for satisfactory operation are: (a) it must have a flexibility capable of flexing with the domed section of the diaphragm, (b) it must be stiff enough, strong enough and tear-resistant enough to resist stud pull-out under normal working conditions, and (c) it must be able to be adhered to the rubber matrix used for the diaphragm material, which may be natural rubber or a synthetic rubber such as GRS (butadiene-Styrene rubber), or Neoprene. I have found that nylon fully meets these criteria; and that such plastics as a cross-linked polyethylene and Lexan, a polycarbonate resin product of the General Electric Company, meet these criteria satisfactorily. I have found that the use alone of such a plastic material for the reinforcing disc enhances the pull-out resistance up to 50% over the best results obtainable with a fabric reinforcement.

Such a plastic material disc is the disc 26 which is embedded in the domed section 12 and in said nodule member 14, the part 26 of the disc embedded in the nodule member being located above the stud head 18 and closely surrounding the stud shank 20, as depicted in FIGS. 2 and 3 of the drawings. As shown, the plastic disc 26 is preferably located above the reinforcing fabric sheet 22, and thereby the part 26' of the plastic disc is located above the part 22' of the reinforcing fabric sheet.

In the operation of this type of valve diaphragm D, the elastomer body 10 is depressed from the dome upright position shown in FIG. 2 to an opposite and dome inverted position and is then returned to its dome upright position, the domed section 12 of the elastomer body being thereby flexed in the operation of the diaphragm between these positions. The disc 26, made out of the selected plastic materials referred to, possesses a flexibility capable of flexing with the domed section of the diaphragm between the said dome upright and dome inverted positions; and in addition to this flexible property of these plastic materials, the plastic disc possesses the desired stiff and tear resistant characteristics required. The plastic material selected is also capable of being adhered to the rubber matrix of the elastomer body 10, this being accomplished with the use of a nylon-rubber adhesive.

It is important to note that such a plastic disc made for example from nylon, because of its flexibility, may be made much larger in diameter than metal discs, and thus give sufficient area for proper adhesion to the elastomer structure and as a result give superior resistance to the shear stresses set up in valve operation, thereby greatly improving the performance of such diaphragms.

The use of plastic in place of fabric for reinforcement against stud pull-out is also advantageous in that the inner edge of the disc member surrounding the stud shank can be reinforced by forming a round boss or enlarged bead 28 on the inside edge of the disc. With discs having a punched out central hole, the bead may be formed by heated tool applied to the disc inside edge. If the disc is molded, this edge can be given the desired shape for maximum reinforcement by cutting the mold to the desired shape. Also, by molding the disc, its thickness can be varied from a maximum thickness at the inside edge to paper-thin at the outside edge so as to give the maximum reinforcement with the minimum outer edge stiffening.

The size of the disc can vary considerably depending upon the size and configuration of the diaphragm. In general, it should extend well over the domed area of the diaphragm, i.e. over a substantial area of the domed section of the diaphragm, to give the maximum adhesion to the fabric-elastomer structure. The diameter of the plastic disc may be further enlarged to give even better reinforcement by slitting the outside portion of the disc so as to give more surface in contact with the fabric-elastomer structure without unduly stiffening the diaphragm. This is depicted in FIG. 4 of the drawings wherein a plastic disc of an enlarged diameter is shown, the outside portion of which is provided with a plurality of radial slits 30, 30.

In FIG. 5 of the drawings I show a modification of the valve diaphragm in which a plurality of plastic discs are employed. In this modification the parts similar to the parts of the diaphragm shown in FIGS. 2 and 3 are designated by similar but primed reference characters. In this modification two plastic discs 32 and 34 are employed, each embedded in the domed section and in the nodule member of the diaphragm, the parts of the discs embedded in the nodule member being located above the head 18' and surrounding the shank 20' of the stud 16' as clearly shown in FIG. 5 of the drawings. In this modification the fabric reinforcement 36 is located between the two plastic discs 32 and 34 as clearly depicted in FIG. 5 of the drawings.

The making of the reinforced valve diaphragm of the present invention, the functioning thereof and the advantages obtained thereby will, it is believed, be fully apparent from the above detailed description thereof. It will be further apparent that many changes may be made in the described construction without departing from the spirit of the invention defined in the following claims.

I claim:

1. In a valve diaphragm comprising an elastomer body having a domed section provided with a central nodule member, a diaphragm lifting stud having a head embedded in said nodule member and a shank protruding therefrom, the said elastomer body being capable of being flexed between dome upright and dome inverted positions, a disc embedded both in said domed section and in said nodule member, the part embedded in said nodule member being located above the head and surrounding the shank of said stud, and the part embedded in said domed section extending over a substantial area of the domed section, said disc comprising a tear resistant, stiff yet flexible member made of a non-fabric sheet of plastic material adheringly attached to the elastomer material of the diaphragm body, said disc having a flexibility capable of flexing with the domed section of the diaphragm, said disc acting to strengthen the diaphragm against stud pull-out in the operation of the valve.

2. The valve diaphragm of claim 1, in which the elastomer material of said body is selected from the class consisting of natural rubber and synthetic rubber and the plastic material of said disc is selected from the class consisting of nylon, a cross-linked polyethylene material and a polycarbonate resin.

3. The valve diaphragm of claim 1, in which the inner edge of the disc member surrounding the stud shank is formed with an enlarged bead for increased strength and the outer edge of the disc member is provided with radial slots for increased flexibility.

4. In a valve diaphragm comprising an elastomer body having a domed section provided with a central nodule member, a diaphragm lifting stud having a head embedded in said nodule member and a shank protruding therefrom, the said elastomer body being capable of being flexed between dome upright and dome inverted positions, a fabric reinforcement in said elastomer body having a part located above the head and surrounding the shank of said stud, a disc embedded both in said domed section and in said nodule member, the part embedded in said nodule member being located above the head and the fabric reinforcement and surrounding the shank of said stud, and the part embedded in said domed section extending over a substantial area of the domed section, said disc comprising a tear resistant, stiff yet flexible member made of a non-fabric sheet of plastic material adheringly attached to the elastomer material of the diaphragm body, said disc having a flexibility capable of flexing with the domed section of the diaphragm, said disc acting to strengthen the diaphragm against stud pull-out in the operation of the valve.

References Cited by the Examiner

UNITED STATES PATENTS

| 2,615,471 | 3/49 | McFarland | 251—331 |
| 2,947,325 | 8/60 | McFarland | 251—333 |
| 3,026,909 | 3/62 | Boteler | 251—331 |

FOREIGN PATENTS

| 693,845 | 7/53 | Great Britain. |
| 845,266 | 8/60 | Great Britain. |

ISADOR WEIL, *Primary Examiner.*

WILLIAM F. O'DEA, *Examiner.*